(12) United States Patent
Ninomiya et al.

(10) Patent No.: US 7,934,106 B2
(45) Date of Patent: Apr. 26, 2011

(54) POWER CONTROL FOR FAST INITIALIZATION OF RECORDING APPARATUS

(75) Inventors: Hideyuki Ninomiya, Osaka (JP); Kiyokazu Yamanaka, Ashiya (JP)

(73) Assignee: Panasonic Corporation, Osaka (JP)

( * ) Notice: Subject to any disclaimer, the term of this patent is extended or adjusted under 35 U.S.C. 154(b) by 1317 days.

(21) Appl. No.: 11/318,203

(22) Filed: Dec. 23, 2005

(65) Prior Publication Data

US 2006/0140577 A1 Jun. 29, 2006

(30) Foreign Application Priority Data

Dec. 27, 2004 (JP) .................... 2004-376331

(51) Int. Cl.
*G06F 1/26* (2006.01)
*G06F 15/177* (2006.01)
(52) U.S. Cl. .................................. 713/300; 713/1
(58) Field of Classification Search .............. 713/300, 713/324, 1
See application file for complete search history.

(56) References Cited

U.S. PATENT DOCUMENTS

| | | | | |
|---|---|---|---|---|
| 6,091,686 A | * | 7/2000 | Caffarelli et al. | 369/53.24 |
| 6,310,848 B1 | * | 10/2001 | Ueki | 369/53.37 |
| 6,496,456 B2 | * | 12/2002 | Ueki | 369/47.33 |
| 6,801,489 B2 | * | 10/2004 | Abe et al. | 369/47.33 |
| 2004/0153784 A1 | | 8/2004 | Lee | |

FOREIGN PATENT DOCUMENTS

| | | |
|---|---|---|
| JP | 02-091859 | 3/1990 |
| JP | 10-055619 | 2/1998 |
| JP | 10-093918 | 4/1998 |
| JP | 2001-210002 | 8/2001 |
| JP | 2003-317389 | 11/2003 |
| JP | 2004-147200 | 5/2004 |

OTHER PUBLICATIONS

Chinese Office Action for corresponding application No. 200510134152.1 dated Aug. 8, 2008.

* cited by examiner

*Primary Examiner* — Thomas Lee
*Assistant Examiner* — Eric Chang
(74) *Attorney, Agent, or Firm* — Renner, Otto, Boisselle & Sklar, LLP

(57) ABSTRACT

A data processing apparatus according to the present invention is capable of writing video and/or audio data to a storage medium. The data processing apparatus includes: a power controller for controlling powering on or off; a signal processing circuit for generating data; and a drive section for writing the generated data to the storage medium. In response to a powering-off instruction, the power controller stops supplying power to the drive section but continues to supply power to the signal processing circuit and the power controller itself. Since hardware elements remain energized, they do not need to perform initialization operations when the apparatus is powered on. Similarly, corresponding software elements are also in an operable state, and therefore do not need to perform initialization processes. Therefore, the signal processing circuit can immediately start processing thereafter.

5 Claims, 6 Drawing Sheets

POWER CONTROL FOR FAST INITIALIZATION OF RECORDING APPARATUS

BACKGROUND OF THE INVENTION

1. Field of the Invention

The present invention relates to operations of an apparatus which receives a broadcast wave and records a program. More specifically, the present invention relates to an operation of a recording apparatus after power is turned on and until recording is started, and, an operation of a recording apparatus when power is turned off.

2. Description of the Related Art

Recording apparatuses (recorders) for recording broadcast programs onto a storage medium such as a magnetic tape, a DVD, or a hard disk have been prevalent. By using such a recording apparatus, a user can not only record a program which is being played back, but, with the use of a scheduled recording function, can also record a program on a designated channel at a designated point in time.

FIG. 5 shows the functional block structure of a conventional recorder 100. Consider a situation where the recorder 100 has not been powered on, but the user wishes to record a program which is being played back on a TV set (not shown). When the user powers on the recorder 100, a message that the recorder 100 has been booted is displayed on a state display section 140, and the recorder 100 supplies power to its respective components in a predetermined order, and initialize them.

FIG. 6 shows an exemplary procedure by which the recorder 100 performs initialization. When the user presses a power button (not shown) on the main body of the recorder 100, power is supplied from a power controller 130 to a signal processing circuit 110, and the components in the signal processing circuit 110 are booted one after another. Specifically, a system controller 111 is initialized first, thus transitioning to a state where it is capable of executing programs. The system controller 111 reads a program from a ROM 120b in a data storing section 120, and loads the program onto a RAM, 120a. Based on this program, then system controller 111 initializes an operation system (OS). Concurrently with this process, power is also supplied to a drive section 150, and a boot process is started so that drive section 150 becomes ready to perform data read/write to a DVD 51.

After the OS initialization, the components in the signal processing circuit 110 are initialized. This initialization is performed in the following order: a playback processor 116, a tuner 160 as well as its input signal processor (e.g., an A/D conversion section) 161, a digital input/output interface 112, a recording processor and then a recording controller 114. When the boot of the recording controller 114 has been completed, it is then confirmed whether the boot of the drive section 150 has been completed or not. These steps pertain to a hardware initialization process. Thereafter, a software initialization process, e.g., initialization of the file system and application software, is performed.

Once the hardware and software initialization processes are completed, a digital signal of a broadcast program is input to the interface 112, and compressed/encoded by the recording processor 113. The resultant data (e.g., program data) is stored (buffered) to a buffer memory 115 under the control of the recording controller 114. When a predetermined data amount is reached, the drive section 150 writes the buffered data on the DVD 51. Thus, it may be said that recording is started at the point where program data begins to be stored in the buffer memory 115. For the above-described technique, one may refer to Japanese Laid-Open Patent Publication No. 2004-147200, for example.

The above-described process is generally the same also for scheduled recording, except that the recorder 100 is powered on by the power controller 130, which internalizes a timer microcomputer (not shown), rather than by the user.

A conventional recorder must perform various initialization processes after being powered on, thus causing a problem in that it requires a long boot time before recording can be started. For example, some DVD recorders that are currently on the market may take a boot time of about 30 seconds. Since it is impossible to record any program during the boot time, a user of such a recorder cannot begin recording from the exact scene at which the user wished to begin recording.

Note that a recorder might be operated in such a manner that the recorder is powered on earlier than the actual recording start time, thus completing booting by the recording start time, whereby a program will be recorded without disruption problems. However, such an operation is only applicable to the case where the recording start time is previously known (e.g., when performing a scheduled recording), and is not applicable to all kinds of recording.

SUMMARY OF THE INVENTION

In order to overcome the problems described above, an objective of the present invention is to reduce the boot time required by a recorder after the recorder is powered on and until a recording can be started, and also enable recording of a program in a manner which prevents disruptions in its video and audio.

A data processing apparatus according to the present invention comprises: a power controller for controlling powering on or off; a signal processing circuit for generating video and/or audio data; and a drive section for writing the generated data to a storage medium. In response to a powering-off instruction, the power controller stops supplying power to the drive section but continues to supply power to the signal processing circuit and the power controller itself.

The data processing apparatus may further comprise a receiving section for receiving a signal containing the video and/or audio; the signal processing circuit may generate the data based on the received signal; and in response the powering-off instruction, the power controller may stop supplying power to the receiving section.

The data processing apparatus may further comprise a data storing section; and before the power controller stops supplying power to the drive section, the signal processing circuit may execute at least one operation selected from the group consisting of: determination of a type of the storage medium; determination of whether writing to the storage medium is possible or not; determination of a remaining capacity of the storage medium; and acquisition of a control parameter necessary for the drive section to perform a data write operation, and the signal processing circuit may write information indicating results of the operation to the data storing section.

In response to the powering-off instruction, the power controller may continue to supply power to the data storing section.

The signal processing circuit may comprise: a system controller for controlling an operation of the entire data processing apparatus; an interface for receiving a signal related to the video and/or audio: a recording processor for generating the data based on the received signal; and a recording controller for outputting the generated data to the drive section, and instructing the drive section to write the generated data, and in response to the powering-off instruction, the power controller may continue to supply power to at least the system controller.

Based on an instruction from a user, the power controller may choose whether or not to continue to supply power to the signal processing circuit.

Alternatively, a processing apparatus according to the present invention comprises: a power controller for controlling powering on or off; a signal processing circuit for generating video and/or audio data; and a drive section for writing the generated data to a storage medium. In a powered-off state where the power controller does not supply power to the drive section but continues to supply power to the signal processing circuit and the power controller itself, in response to a powering-on instruction, the power controller supplies power to the drive section and the signal processing circuit starts generating the data.

The signal processing circuit may further comprise: a system controller for controlling an operation of the entire data processing apparatus; an interface for receiving a signal related to the video and/or audio; a recording processor for generating the data based on the received signal; a recording controller for outputting the generated data to the drive section, and instructing the drive section to write the generated data; and a buffer memory for temporarily storing the data, and in response to the powering-on instruction, the recording controller may store the generated data to the buffer memory.

The system controller may determine whether a recordable storage medium data is present in the data processing apparatus, and confirm whether the drive section has booted to a state where the drive section is ready to perform a write process; and when it is determined that a recordable storage medium is present in the data processing apparatus and the drive section has booted to the state where the drive section is ready to perform a write process, and if the data stored in the buffer memory has reached a predetermined reference data amount, the system controller may output an instruction to the recording controller, and based on the instruction, the recording controller may output the stored data to the drive section and instructs the drive section to write the data.

The data processing apparatus may further comprise a data storing section; the data storing section may store information indicating a result of determination as to whether it is possible to write data to the storage medium; and if the result of the determination indicates that it is possible to write data to the storage medium, the system controller may output the instruction to the recording controller.

The result of the determination may be acquired and stored to the data storing section before supply of power is stopped.

The data processing apparatus may be capable of displaying the result of the determination to the display device as a notification to a user; and at least when the result of the determination indicates that it is impossible to write data to the storage medium, the data processing apparatus may display the result of the determination via the display device.

The result of the determination may be acquired and stored to the data storing section before supply of power is stopped.

Alternatively, a data processing apparatus according to the present invention comprises: a power controller for controlling powering on or off; a signal processing circuit for generating video and/or audio data; and a drive section for writing the generated data to a storage medium. When a powering-off instruction is received, the power controller continues to supply power to the signal processing circuit, the drive section, and the power controller itself; and in response to the powering-off instruction, the signal processing circuit places the drive section in a sleep state.

According to the present invention, even in a powered-off state of the apparatus, power continues to be supplied to at least some of the components of the signal processing circuit and to the power controller. Since such hardware elements always remain energized, they do not need to perform initialization operations when the apparatus is powered on the next time. For the same reason, software elements such as the operating system, the file system, and the application software are already in an operable state, and therefore initialization processes for such software elements are also unnecessary. Therefore, the signal processing, circuit can immediately start processing, and begin to store the obtained data to the buffer memory. Since the data in the buffer memory is written after boot of the drive section, in effect, recording has begun since the start of processing by the signal processing circuit. Therefore, the user is able to start recording from immediately after the exact scene at which the user wished to begin recording. Since the boot time is greatly reduced, a very convenient apparatus is provided.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 is a chart showing a procedure by which initializations are performed in the recorder 1 after being powered on.

DETAILED DESCRIPTION OF PREFERRED EMBODIMENTS

Hereinafter, with reference to the accompanying drawings, an embodiment of the data processing apparatus according to the present invention will be described. In the following embodiment, the data processing apparatus will be illustrated as an apparatus for receiving a broadcast wave and recording a program (recorder).

Figure 1:
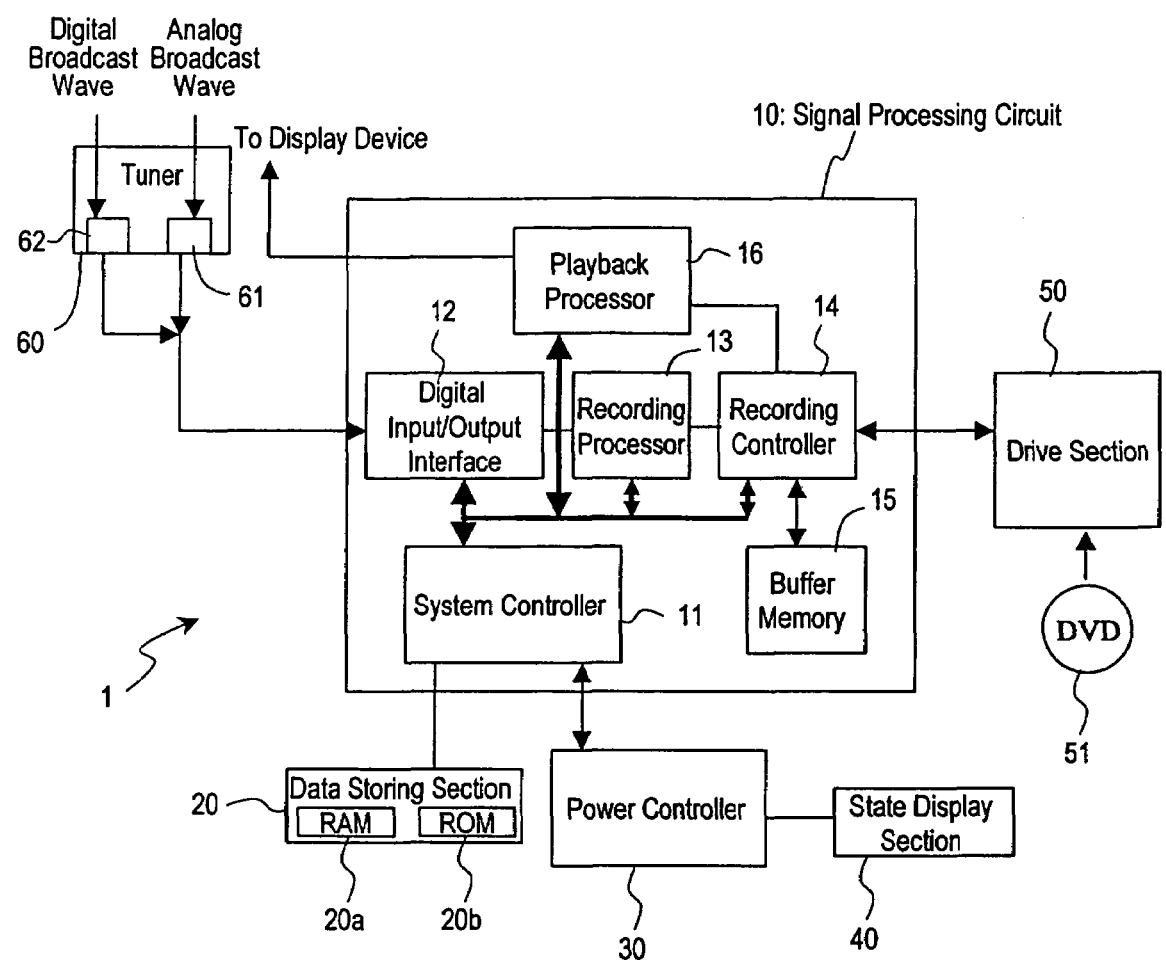
FIG. 1 is a diagram showing the functional block structure of a recorder 1 according to an embodiment of the present invention.

FIG. 1 shows the functional block structure of a recorder 1 according to the present embodiment. The recorder 1 includes a signal processing circuit 10, a data storing section 20, a power controller 30, a state display section 40, a drive section 50, and a tuner 60.

The basic function and operations of the recorder 1 are as follows. The recorder 1 receives an analog broadcast wave and subjects it to a predetermined compression/encoding process, thus generating an MPEG-2 program stream of a program (hereinafter referred to as a "program stream"). Moreover, the recorder 1 extracts TS packets of a specific program from an MPEG-2 transport stream of a digital broadcast wave, and generates a program stream based on the compressed/encoded video data and (compressed) encoded audio data composed of the data within that packet. Thereafter, the recorder 1 writes the generated program stream on a DVD 51 (e.g., a DVD-RAM) by utilizing the drive section 50.

Although the present embodiment illustrates the storage medium as being a DVD, this is only exemplary. A different type of optical storage medium (e.g., a Blu-ray disc) may be used, or a magnetic storage medium such as a tape or a hard disk may also be used. However, it is necessary to write data in a data format which is in accordance with the type of the storage medium adopted. The DVD 51 itself is a removable medium, and therefore is not a component of the recorder 1. However, in the case where the storage medium is a non-removable medium (e.g., a commonly-available hard-disk), the storage medium will be a component of the recorder 1.

Hereinafter, the functions of the components of the recorder 1 will be described first, followed by descriptions of operations of the recorder 1 related to the present invention.

The signal processing circuit 10 is a circuit which processes digital signals. Specifically, the signal processing circuit 10 performs encoding, decoding and format conversion of digital signals, as well as generation of a program stream to be written to the DVD 51, for example. The signal processing circuit 10 includes a system controller 11, a digital input/output interface 12, a recording processor 13, a recording controller 14, a buffer memory 15, and a playback processor 16.

The system controller 11 is a control microcomputer or a special-purpose CPU chip, for example, which controls not only the signal processing circuit 10 but the entire recorder 1. Specifically, in accordance with instructions issued from the system controller 11, the components described below will realize their functions and operations. The digital input/output interface 12 (hereinafter referred to as an "interface 12") performs a format conversion, an image quality enhancing process, etc., for a digital signal which has been input from the tuner 60. For example, in the case where the digital signal is a program signal related to high definition (HD) video, the interface 12 performs a format conversion process which involves a thinning process or the like to decrease definition. Note that, although the interface 12 is illustrated as receiving a digital signal, the interface 12 may alternatively receive an analog signal, subject it to an A/D conversion process, and output a digital signal. In this case, an analog signal processor 61 may be provided in the interface 12.

The recording processor 13 performs an image compression process, an audio compression process, and multiplexing of the compressed image data and audio data, and sends the multiplexed data to the recording controller 14. Note that, while a digital broadcast wave is being received at the tuner 60, if the received signal is a program signal related to standard definition (SD) video, the recording processor 13 does not need to perform a compression process. Instead, based on an input digital signal (elementary stream), the recording processor 13 may generate video packs and audio packs, etc., each of which has data size of 2048 bytes, multiplex them, and generate a program stream. Note that a digital signal may be supplied to the recording controller 14 via a route (not shown) which does not involve the recording processor 13.

Based on an instruction from the system controller the recording controller 14 controls the data read and data write operations of the drive section 50. The recording controller 14 sends data (program stream) which is input from then recording processor 13 to the drive section 50, and instructs the drive section 50 to write the data to the DVD 51 When performing a data read, the recording controller 14 specifies to the drive section 50 as to which data is to be read, and transfers to the playback processor 16 the data that has been read. When performing these processes, the recording controller 14 temporarily sends a program stream to the buffer memory 15, thus allowing the program stream to be stored therein. This is because a more stable write to the DVD 51 is made possible by beginning a write after a certain amount of program data (program stream) has been stored to the buffer memory 15.

The buffer memory 15 is a memory for temporarily storing a program stream. In the present embodiment, the buffer memory 15 temporarily stores a program stream until the drive section 50 completes booting.

The playback processor 16 performs a separation process of separating the multiplexed video and audio encoded-data from the program stream which has been written to the DVD 51. The playback processor 16 also performs a video decoding process of decoding the video encoded data into digital video data, and an audio decoding process of decoding audio encoded data of various standards into digital audio data. The playback processor 16 further converts the digital data into analog data, and outputs it to a display device. The playback processor 16 is also able to perform a process of superposing a predetermined menu onto the video to be played back. The video and audio are output to a display device for displaying video (e.g. a TV set) and a device such as a loudspeaker.

The data storing section 20 is a block including a volatile memory (RAM) 20a and a non-volatile memory (ROM) 20b. It is assumed that the ROM 20b is a memory (e.g. EEPROM) which accepts data write. The RAM 20a stores data such as status of a storage medium which has been mounted to the drive section 50 of the recorder 1 (e.g., whether the disk is of a type which supports writing or whether the disk has any vacant area) as well as control parameters such as the laser power value which is optimum for a data write utilizing the drive section 50. As necessary, the retained data may also be written to the ROM 20b for further retention. Moreover, a boot program for the recorder 1 which is stored in the ROM 20b is loaded to the RAM 20a, for use by the system controller 11 when executing that program. Alternatively, the system controller 11 may directly execute such a program from the ROM 20b, and in this case, the program does not need to be loaded and loaded onto the RAM 20a.

The power controller 30 individually controls power to each component in the recorder 1, and also controls power to the entire recorder 1. Specifically, the power controller 30 performs power control in response to powering on/off instructions from a user. Such an instruction is input to the recorder 1 as the user presses a power button (not shown) on the main body of the recorder 1 or a remote control, for example. Then, the power controller 30 passes the instruction to the system controller 11. The power controller 30 also includes a timer microcomputer (not shown), and keeps the system's time information under management.

For example, when a scheduled recording is designated, the power controller 30 allows power to be supplied to each component of the recorder 1 at a designated point in time. Moreover, based on a powering-off instruction from the user, the power controller 30 cuts off power to any component other than the signal processing circuit 10, or cuts off the power of the entire recorder 1. When only the signal processing circuit 10 is to be energized, the power controller 30 may perform further control such that only a specific element(s) (e.g. the system controller 11) in the signal processing circuit 10 is energized.

Unless otherwise specified, in the present specification, "powering on (turning on)" means supplying power, whereas "powering off (turning/cutting off)" means stopping supply of power. The expressions "powering on" and "powering off" are to be used not only with respect to powering on/off of the entire recorder 1, but also with respect to powering on/off of each individual component in the recorder 1.

The state display section 40, which may be composed of a liquid crystal, an FL tube (fluorescent display tube), or the like, displays to the user information as to whether the recorder 1 has been powered on. For example, the current time or the like may be displayed in a powered-off state. In a powered-on state, the recordable time at that point, or a symbol indicating playback, fast-forward, rewind, etc., may be displayed.

The drive section 50 includes an optical head (not shown) for emitting laser light toward the DVD 51. For example, the drive section 50 receives program data of a program to be recorded, and writes the program data on the DVD 51 by using this optical head. Moreover, the drive section 50 reads and output program data which has been written. When writing program data, the drive section 50 adjusts the intensity of the laser light which is emitted from the optical head so as to become optimum for writing, and performs a write at that intensity. The operation of making an adjustment so as to enable writing under the optimum conditions is referred to as a learning operation. Moreover, when the DVD 51 is slightly warped (tilted), the drive section 50 changes the position of an objective lens in the optical head in accordance with the warpage of the DVD 51, thus performing focusing control so that the focal point position of the laser light is located on an information recording surface of the DVD 51. Furthermore, the drive section 50 adjusts the optical head position to perform tracking control so that the focal point position of laser light is located on a track formed on the DVD 51. Although "program data" has been illustrated in the above description, any type of data other than program data may also be used. For example, data which has been input via a route other than via the tuner (e.g., a line input) may also be used.

The tuner 60 receives an analog broadcast wave or a digital broadcast wave from a broadcast station and demodulates it. As for the analog broadcast wave, since a different frequency will be used by each broadcast station, the tuner 60 selects an appropriate channel based on frequency. The signal on the selected channel is converted by the analog signal processor 61 (which performs an A/D conversion) into a digital signal for output. As for a digital broadcast wave, a digital signal processor 62 of the tuner 60 extracts a TS packet of an appropriate program from the received transport stream, in accordance with the channel number designated by the signal processing circuit 10. The digital signal processor 62 further acquires an elementary stream from the TS packet, and outputs it as a digital signal. The digital signal processor 62 functions as a so-called TS decoder.

Next, the operations of the recorder 1 will be described. A main feature of the recorder 1 according to the present embodiment is that, even in a powered-off state of the recorder 1, the recorder 1 continues to supply power to at least some of the component of the signal processing circuit 10 and to the power controller 30. Since such hardware elements remain energized, they do not need to perform initialization operations when the recorder 1 is powered on the next time. For the same reason, software elements such as the operating system, the file system, and the application software have also been already loaded and are in an operable state, and therefore initialization processes for such software elements are also unnecessary. Therefore, upon completion of the boot of the tuner 60 as well as its analog signal processor 61 and digital signal processor 62, the signal processing circuit 10 of the recorder 1 can immediately start processing, and begin to store the obtained data to the buffer memory 15.

Hereinafter, the operations of the recorder 1 will be specifically described. First, an operation to be performed when the recorder 1 is powered off will be described. Then, an operation (boot operation) to be performed when, in response to a powering-on, resuming from a powered-off state will be described.

Figure 2:
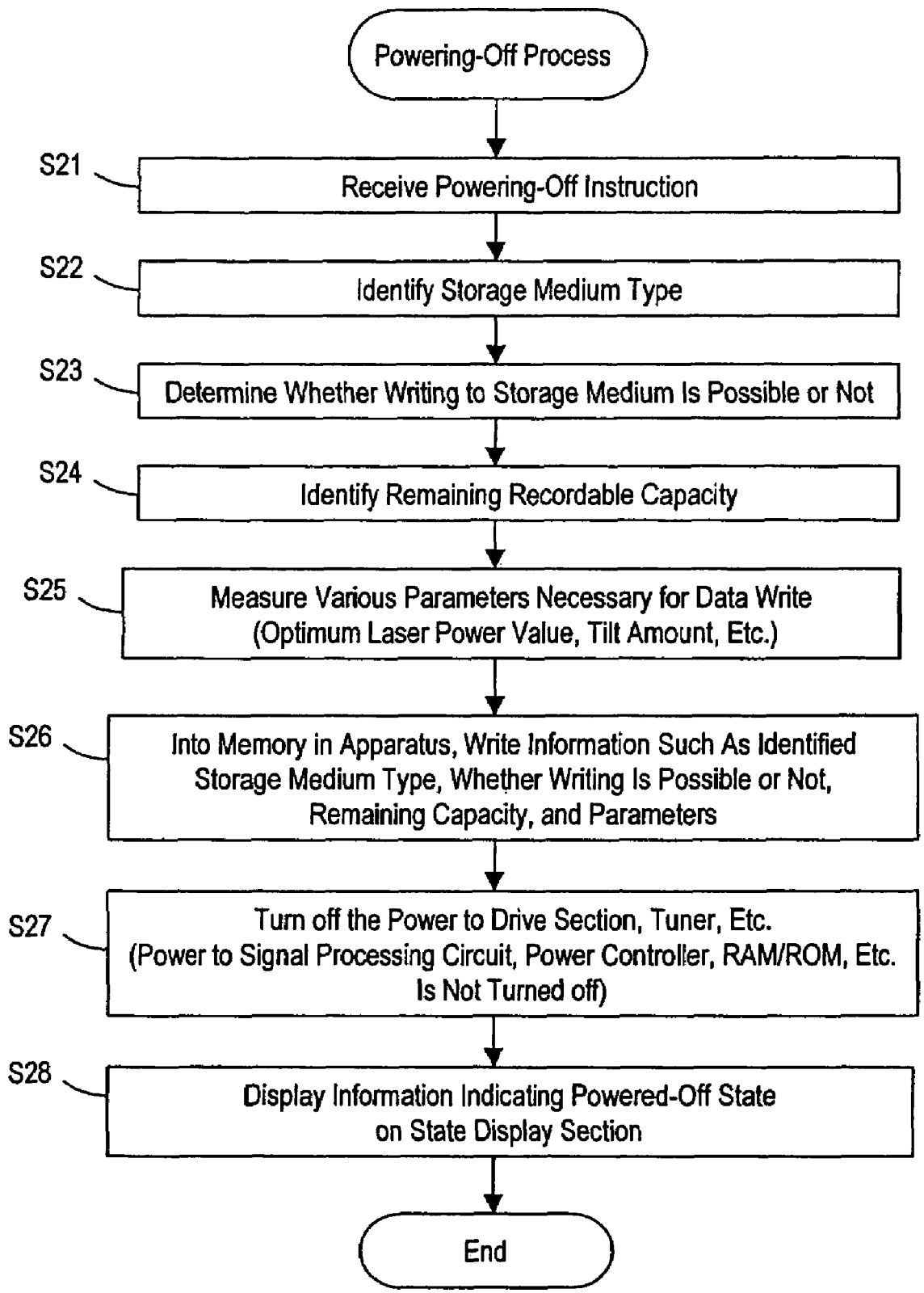
FIG. 2 is a flowchart showing a processing procedure when the recorder 1 is powered off.

FIG. 2 shows a processing procedure when the recorder 1 is powered off. It is assumed that the power of the recorder 1 has been turned on, so that the recorder 1 is already in a state where it is capable of recording programs and playing back recorded programs.

Firstly, at step S21, the power controller 30 of the recorder 1 receives a powering-off instruction from the user. When the power controller 30 notifies this instruction to the system controller 11, the system controller 11 instructs the recording controller 14 to identify the type of a storage medium which is mounted to the drive section 50. The recording, controller 14 causes the drive section 50 to operate, and acquires the physical characteristics (e.g. shape), optical characteristics (e.g. reflected light amount, reflectance), and data structure of the storage medium. As a result, at step S22, the recording controller 14 is able to identify the type of the storage medium. In the present embodiment, it is assumed that the mounted storage medium is a recordable DVD 51 (DVD-RAM).

Note that, although there exist various types of optical disks, a DVD 51 differs from a CD, Blu-ray disk, or the like in term of their optical characteristics, and therefore can be differentiated based on such characteristics. Even among recordable DVDs, a DVD-RW can be distinguished from a DVD-RAM based on differences in the sector structure and the like.

Next, at step S23, it is determined whether writing to the storage medium is possible or not. In this exemplary case, the system controller 11 determines that the mounted DVD 51 accepts writing. This process is necessary in the case it is determined that the mounted storage medium is a recordable DVD-R which permits only one write, for example, because no more data can be written to such a DVD-R once it has experienced a finalization process.

At the next step S24, the recording controller 14 identifies the remaining recordable capacity. At step S25, the recording controller 14 measures various parameters (optimum laser power value, tilt amount, etc.) which are necessary for a data write. These parameters were already "learned" when the recorder 1 became capable of writing and reading, and have since been retained.

At step S26, the system controller 11 writes to the RAM 20a information such as: the identified storage medium type; whether writing is possible or not; remaining capacity; and various parameters. When the process up to step S26 is ended, the system controller 11 notifies to the power controller 30 that powering-off is now possible. Then, at step S27, the power controller 30 cuts off the power to the drive section 50, the tuner 60, and other components (not shown). However, the power controller 30 does not cut off the power to the signal processing circuit 10 and the RAM 20a, but keeps these elements energized. Needless to say, the power controller 30 itself also remains energized. Thereafter, at step S28, the state display section 40 displays information indicating a powered-off state.

Note that, assuming that the recorder 1 has a power consumption of about 22 W in the powered-on state, the recorder 1 will have a power consumption of about 7 W in the powered-off state described above. Among other reasons, this is because power to the drive section 50 and the tuner 60 (which consume a lot of power) has been cut off, and because the signal processing circuit 10 does not consume much power since it is not performing a recording process although being energized. If power to the signal processing circuit 10 and the RAM 20a, which are to be kept energized according to the present embodiment, were cut off (as if in a conventional recorder after being powered off), the power consumption would be about 2.5 W. This is because the power-controller 30 would still need to be energized in order to be able to detect a powering-on instruction from a remote control or the like, and to stand by for a scheduled recording, etc.

Energization of the signal processing circuit 10 may be set in a more detailed manner. For example, it would be possible to cut off power to the playback processor 16 in the signal processing circuit 10 because the playback processor 16 being energized or unenergized will not affect delay in the start of recording. Alternatively, instead of cutting off the power, the clock which defines operation speed may be stopped. Power cut or stopping of the clock would effectively reduce power consumption.

On the other hand, the playback processor 16 may be kept energized, in which case GUI data which is stored in the RAM 20a can be read immediately after a boot operation (described below) of the recorder 1, so that a menu can be rapidly displayed. Another advantage in keeping the playback processor 16 energized is that playback can also be immediately started, if there is a desire to begin playback when starting recording.

Note that the processes from steps S22 to S26 only need to be performed before turning off the power to the drive section 50, the tuner 601, etc., and the order of processing is not limited to that described above. For example, in practice, information concerning the storage medium (such as the storage medium type, whether writing is possible or not, and remaining capacity) is likely to be acquired and stored in the RAM 20a before powering off. Therefore, when receiving a powering-off instruction, the processes from steps S22 to S24 can be omitted. The process of step S26 concerning such information can also be omitted. Moreover, since various parameters which are necessary for writing are measured in the drive section 50 before powering off and have since been retained, the process of step S25 can be omitted when receiving a powering-off instruction.

Next, an operation to be performed when the recorder 1, having been placed in an off state through the aforementioned powering-off process, is again powered on will be described.

Figure 3:
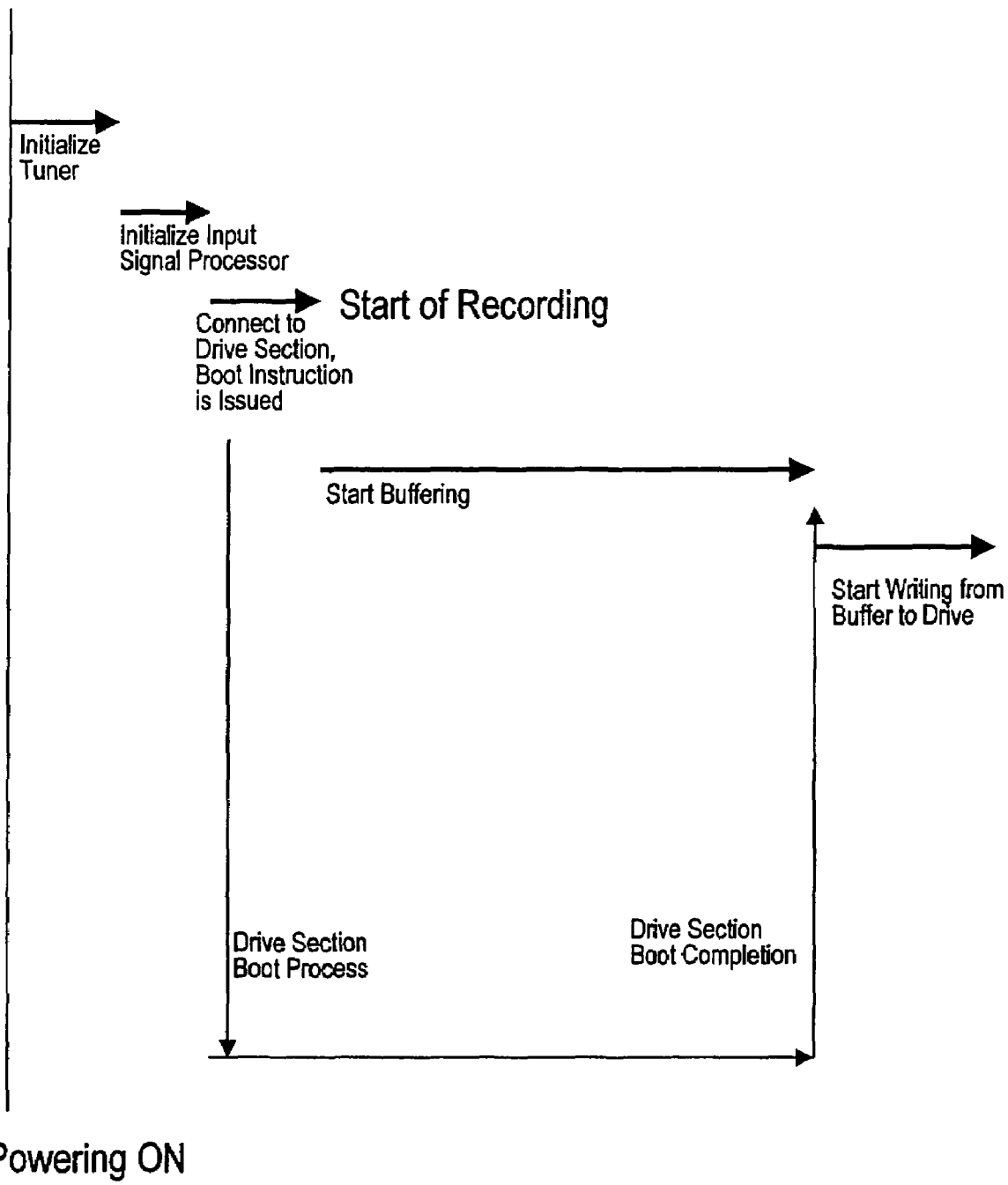

FIG. 3 shows a procedure by which initializations are performed in the recorder 1 having been powered on. The processes which are necessitated by the powering on are mainly initializations of the newly energized elements. Since power to the drive section 50 and the tuner 60 has been cut off through the powering-off process shown in FIG. 2, power of the drive section 50 and the tuner 60 is first turned on. Then, various initialization processes will be started.

Specifically, the entire tuner 60 is powered on, and an initialization is started. Thereafter, initializations of the analog signal processor 61 and the digital signal processor 62 in the tuner 60 are performed. Then, instructions (a connection request and a boot starting instruction) are issued from the recording controller 14 to the drive section 50, and connection between the drive section 50 and the recording controller 14 is confirmed. Thereafter, the drive section 50 will take some time in booting, so that stable data write and read will become possible.

It must be noted that immediately after initializations of the entire tuner 60 and its signal processor 61 and 62 are completed, the processing by the signal processing circuit 10 is started so that compressed/encoded data of a program begins to be stored to the buffer memory 15. This process is performed concurrently with the boot of the drive section 50. Since the signal processing circuit 10 has been kept energized even after powering off, the signal processing circuit 10 has always been in an operable state. Upon receiving a digital signal, the signal processing circuit 10 is ready to start processing to generate a program stream. Therefore, the hardware initializations which are required in the conventional initialization procedure (FIG. 6) (i.e., initialization of the system controller 11, program loading, OS initialization, initialization of the playback processor 11, initialization of the interface 12, and initialization of the recording processor 13 and the recording controller 14) are no longer necessary, and software initializations such as file system initialization and application software initialization are no longer necessary.

Figure 6:
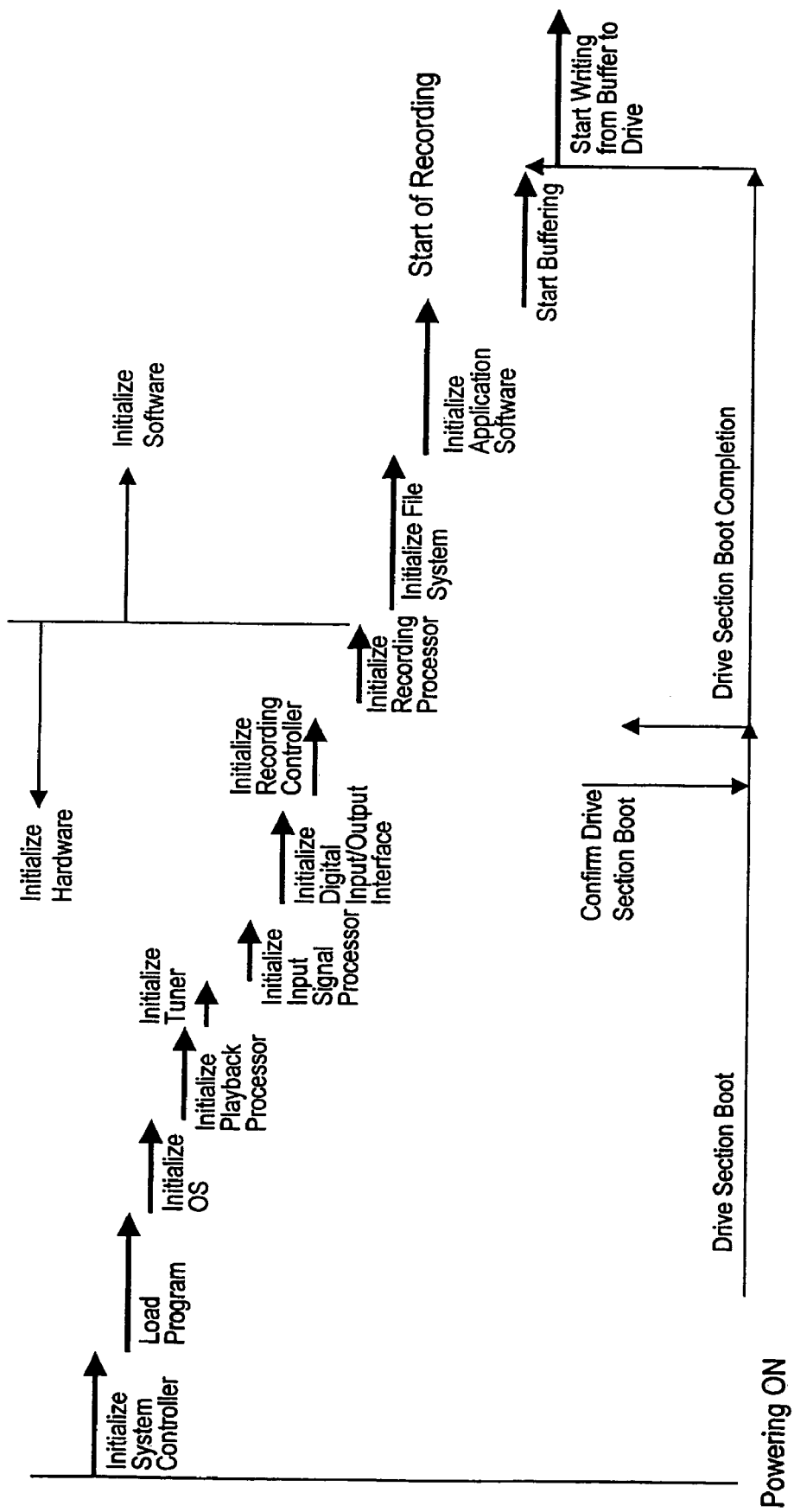
FIG. 6 is a chart showing a procedure by which initializations are performed in the recorder 100.

Once the boot of the drive section 50 is completed and the amount of data in the buffer memory 15 has reached a predetermined data amount, the data is sent to the drive section 50 so as to be written to the DVD 51. Since the start of storage to the buffer memory 15 occurs early, delay in the start of recording can be greatly alleviated. Specifically, in the recorder 1 according to the present embodiment, the period of time which lapses from the powering on to the beginning of storage to the buffer memory 15 is about 1 second. Since recording is started in 1 second after powering on, the scene which the user has wished to record will be hardly missed. This is drastically rapid as compared to the 30 seconds or more which are required by the conventional recorder 100 to start recording. As compared to the procedure up to start of recording by the conventional recorder 1 as shown in FIG. 6, it can be seen that the procedure up to start of recording according to the present embodiment as shown in FIG. 3 is greatly shortened due to omission of initialization processes and the like.

In the recorder 1 of the present embodiment, care must be taken to prevent buffer overflow, because a program stream will begin to be stored to the buffer memory 15 immediately after powering on. When a buffer overflow does occur, or becomes highly likely to occur, it is preferable to change the method of managing the subsequent data storage. Moreover, when a buffer overflow has occurred, it is preferable to make disruptions in the video and the like as difficult to be perceived as possible. Therefore, management methods for the buffer memory 15 will be described below.

FIGS. 4A to 4D show transitions in the data amount in the buffer memory 15 according to various memory management methods. The horizontal axis represents time, whereas the vertical axis shows the last address of data to be stored in the buffer. The horizontal axis is taken so that the time of starting storage to the buffer memory 15 is at zero. The vertical axis is taken so that data is stored to the buffer memory 15 from the smaller address first, the last address being denoted as $B_E$. It is conveniently assumed that the last address value corresponds to the data amount. For example, when data is stored up to the last address $B_E$, the data amount will come to $B_E$.

Figure 4A:
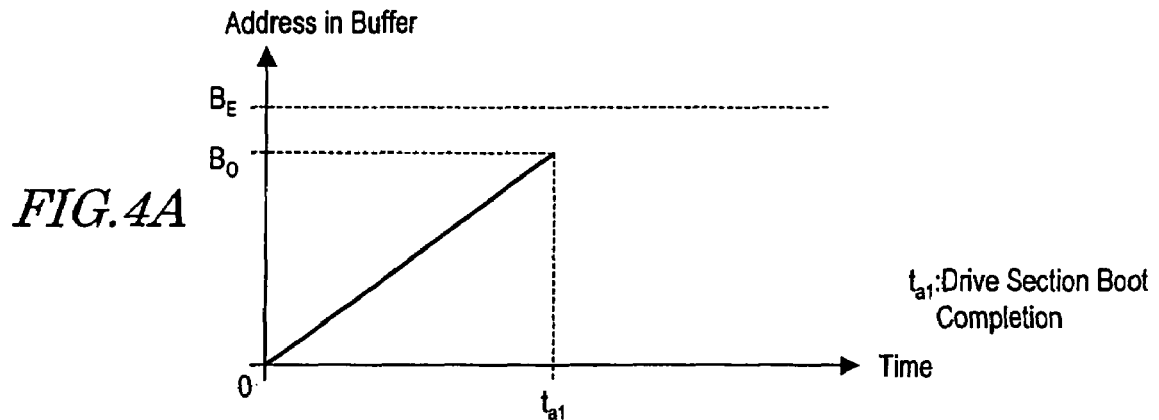
FIGS. 4A, 4B, 4C, and 4D are graphs showing transitions in the data amount in a buffer memory 15 according to various memory management methods.

First, FIG. 4A will be referred to. Suppose that the boot of the drive section 50 is completed at time $t_{a1}$. At this point, the last address of the data which has so far been stored is $B_0$, the stored data amount also being $B_0$. The recording controller 14 reads the data which has been stored in the buffer memory 15, and sends it to the drive section then, the drive section 50 writes this data on the DVD 51. Thereafter, if data is stored up to the address $B_0$, for example, the recorder 1 will write the data which has so far been stored to the DVD 51. It is hereinafter assumed that data will be written to the DVD 51 every time it exceeds the data amount $B_0$. However, this is only exemplary, and may be changed. The data amount $B_0$ will be referred to as a "reference data amount".

Figure 4B:
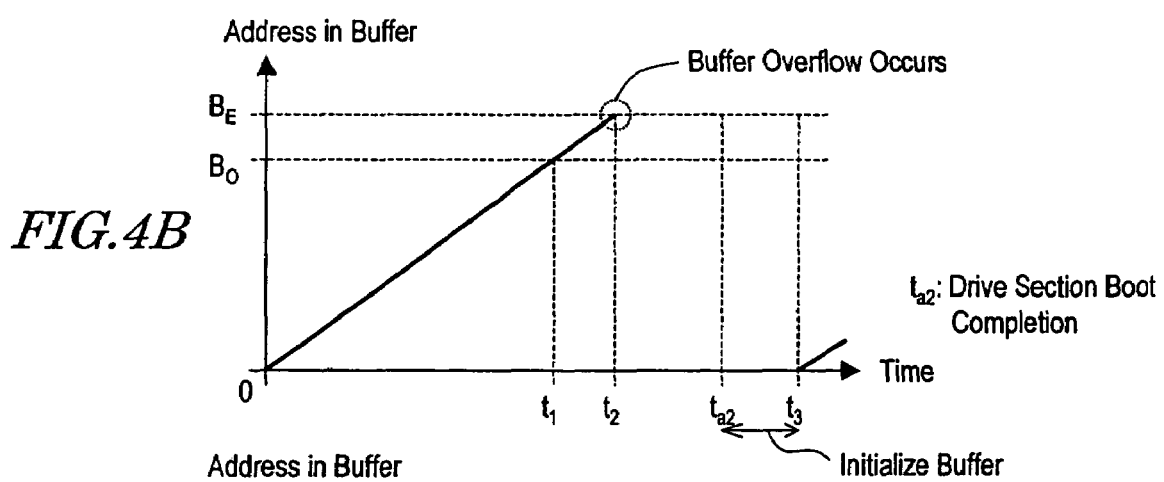

Next, FIG. 4B will be referred to. The drive section 50 in the recorder 1 may become slower to boot due to aging, insufficient power supply, or the like. For example, the boot of the drive section 50 may be completed at time $t_{a2}$, which comes later than time $t_{a1}$. Further suppose that the data amount reaches $B_0$ at time $t_1$ (=time $t_{a1}$ in FIG. 4A), which comes before time $t_{a2}$, and that the data amount reaches $B_E$ at time $t_2$. The data amount $B_E$ corresponds to the buffer-full state.

If time $t_2$<time $t_{a2}$, as shown in FIG. 4B, the stored data cannot be written to the DVD 51 because the boot of the drive section 50 has not been completed. Therefore, completion of the boot of the drive section 50 will be awaited, and only after the boot completion will the data in the buffer memory 15 be written to the DVD 51. Thereafter, the recording controller 14 once clears the buffer memory 15 to perform a buffer initialization process. Assuming that the buffer initialization process is completed at time $t_3$, the time slot in which recording of a program has been performed is from time 0 to time $t_2$, as well as from time $t_3$ onward. In other words, the data from time $t_2$ to time $t_3$ cannot be stored, meaning that the recording of the program is interrupted during this period. For example, suppose that the maximum data amount $B_E$ of the buffer memory 15 is 31 Mbytes, and that this amount of data results in a playback time of 23 seconds. When playback is performed under these conditions, the video will be suddenly disrupted after 23 seconds from the start of playback, and be played back again from a point 10 seconds ahead, for example. This will be very awkward to the user playing back the video.

Figure 4C:
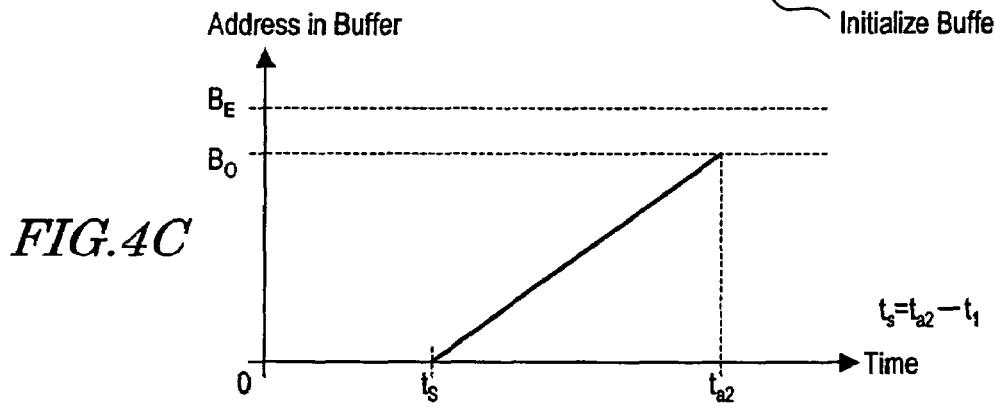

Therefore, a management method as shown in FIG. 4C may be adopted. In FIG. 4C, storage of data is started at time $t_s$. The time period from time 0 to $t_s$ is equal in length to the time period from time $t_1$ (at which the data amount reaches. $B_0$) to the boot-completed time $t_{a2}$ in the drive section 50 shown in FIG. 4B. In other words, the time to start storage is intentionally delayed. By starting the data storage from time $t_s$ which is thus defined, it is ensured that the amount of stored data will reach the reference data amount $B_0$ at time $t_{a2}$, i.e., the point in time when the boot of the drive section 50 will be completed. Thus, data can be written to the DVD 51 without allowing buffer overflow to occur.

If the management method shown in FIG. 4C is adopted after a buffer overflow has occurred, any subsequent buffer overflow can be prevented. Alternatively, the management method shown in FIG. 4C may be adopted before a buffer overflow occurs. For example, when considering aging etc. of the drive section 50 alone, it is unlikely for the boot-completed time $t_{a2}$ of the drive section 50 to suddenly become late. Therefore, the boot-completed time may be monitored, and the aforementioned management method may be adopted when the boot-completed time comes to fall after a certain point. For example, by deciding that a lag of 2 seconds or more will not be tolerated, the management method may be changed when a boot completion time which used to be 15 seconds has been extended to 17 seconds. Alternatively, the recording controller 14 may issue a command to the drive section 50, and monitor the point in time at which the recording controller 14 receives a response from the drive section 50. Then, the system controller 11 may determine whether or not to adopt the management method shown in FIG. 4C based on this time.

Figure 4D:
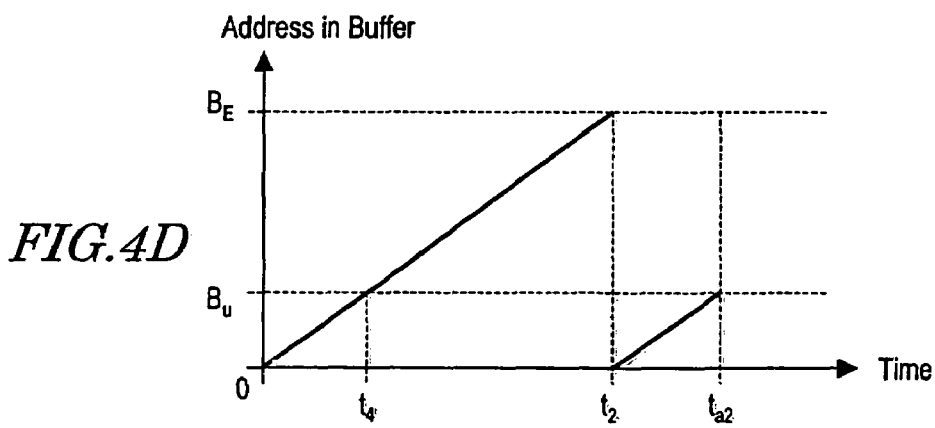
Figure 5:
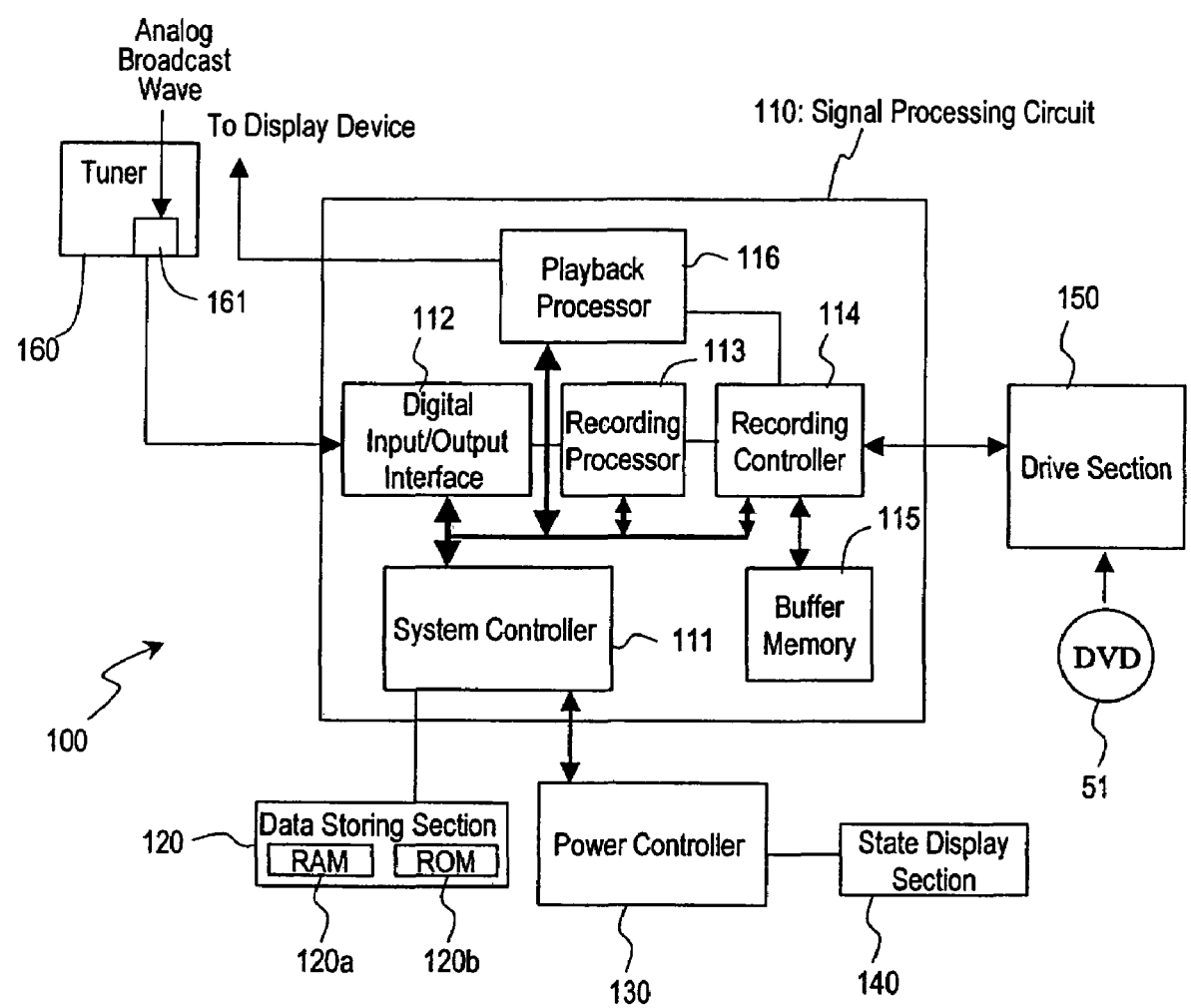
FIG. 5 is a diagram showing the functional block structure of a conventional recorder 100.

Next, FIG. 4D will be referred to. In FIG. 4D, the buffer becomes full at time $t_2$. However, unlike in FIG. 4B, the buffer is not initialized afterwards, but continues storage by simply overwriting data from address 0. Overwriting is continued until boot-completed time $t_{a2}$, so that data will be overwritten up to address $B_u$. Therefore, although it is impossible to playback the data from time 0 to time $t_4$ (at which data is first stored up to the address $B_u$), it is still possible to retain in the DVD 51 the data from time $t_4$ to time $t_{a2}$, which is free from disruption, because initialization of the buffer is not performed. When played back, the program is not disrupted in the middle. Therefore the user will feel far less awkward than in the method shown in FIG. 4B, which allows the program to be interrupted. If any other memory is available in addition to the buffer memory 15, the data from time $t_2$ to time $t_{a2}$ may be stored to that memory. According to this management method, the program can be recorded without disruption.

When any management method different from the basic management method shown in FIG. 4A has been adopted, the system controller 11 may later determine whether or not to switch to the basic management method. If an accidental buffer overflow occurs, a different management method (e.g., the management method shown in FIG. 4C) is adopted for a certain period. Then, after the lapse of that period, if the system controller 11 determines the possibility of another buffer overflow to be low, the management method shown in FIG. 4A may be adopted.

In order to be able to write the data stored in the buffer memory 15 to the DVD 51, it is imperative that the boot of the drive section 50 has been completed. Therefore, it is also important that the drive section 50 can rapidly complete its boot. Therefore, in connection with the structure of the recorder 1 according to the present embodiment, a management method which is effective for realizing a rapid boot of the drive section 50 will now be described.

Note that, in the case where the management method shown in FIG. 4C is adopted, the recording start time is time $t_s$. Since time $t_s$ is determined based on the boot-completed time $t_{a2}$ of the drive section 50, the drive section 50 becoming rapider to boot makes it possible to reduce the amount of time required until recording can be started, which in effect means to the user that the recorder 1 has become rapider to boot. Moreover, if the drive section 50 becomes rapider to boot, it is possible to reduce the amount of memory used in the buffer memory 15. The freed memory can be utilized for any other purpose, or it would also be possible to adopt a buffer memory which has a smaller capacity and therefore is less expensive.

In order to make the drive section 50 rapider to boot, the recorder 1 utilizes the information (the storage medium type, whether writing is possible or not, the remaining capacity, and parameters such as the optimum laser power value and the tilt amount) which was written to the RAM at step S26 in FIG. 2. In other words, the system controller 11 of the recorder 1 transfers the information which is stored in the RAM 20a to the drive section 50 via the recording controller 14. The drive section 50 utilizes this information to complete boot. This setting procedure eliminates the period of time which would have been required to acquire the aforementioned information after powering on. As a result of this, the drive section 50 will take about 10 seconds until boot completion.

The system controller 11 regularly checks whether boot of the drive section 50 has been completed, with an interval of every 200 ms after powering on. As a result, the recorder 1 will be able to start a data write process to the DVD 51 within 200 ms after completion of the boot of the drive section 50.

Note that there is no problem in allowing the information which was stored to the RAM 20a when powering off to be used after a subsequent powering-on because most currently-available recorders are unable to eject a DVD unless powered on. A DVD which has been loaded in a powered-off state usually remains mounted in a subsequent powered-on state, which justifies utilizing the information concerning that DVD (e.g., remaining recordable capacity).

On the other hand, in a conventional recorder, information such as the storage medium type, whether writing is possible or not, and the remaining capacity is determined after data has been buffered for about 20 seconds since powering on; the same is also true of the acquisition of various parameters such as the optimum laser power value and the tilt amount. The amount of times required for such determination and acquisition (setting time) naturally affects the amount of time required until completion of the boot of the drive section. For example, the amount of time required until completion of the boot of the drive section, including the aforementioned setting time, has conventionally been about 20 seconds for a DVD drive. Thus, it will be seen that the boot time of the drive section 50 according to the present embodiment is reduced by about ½.

In order to keep the signal processing circuit 10 and other elements energized in a powered-off state so as to allow information to be retained in the RAM 20a, a power of about 7 W is required. Since this value is greater than that of a conventional recorder (2.5 W), some users may not approve the increase in power consumption. Therefore, the recorder 1 may be arranged so as to allow the user to choose between: a rapid boot mode, in which boot is completed in one second at the cost of a power consumption of 7 W; and a normal boot mode, in which boot requires 20 seconds or more but the power consumption is reduced to 2.5 W. The system controller 11 may write a flag identifying the selected mode to an EEPROM 20b, for example, because once the normal boot mode is selected, the RAM 20a will no longer be energized after powering off. By writing such a flag to the EEPROM 20b, the recorder 1 will be able to continue to operate in the selected mode.

Moreover, the usage of the recorder 1 may be monitored by the power controller 30 of the recorder 1, and if a long period of non-use is detected (e.g., when the recorder 1 has not been powered on for a week), the recorder 1 may automatically switch from the rapid boot mode to the normal boot mode to reduce power consumption.

Although the above-described powering-off process illustrates a case where the RAM 20a is kept energized so as to retain information such as the storage medium type. Alternatively, such information may be written to a buffer (not shown) in the power controller 30 or to the ROM 20b implemented as an EEPROM, in which case the RAM 20a will no longer need to stay energized. This will make for a further reduction in power consumption.

The tuner 60 of the recorder 1 shown in FIG. 1 is not only capable of receiving, a broadcast wave from an antenna or the like, but also capable of receiving a signal of a program which is input via a network, e.g., cable television. A set-top box or the like is also encompassed within the notion of the tuner 60. The recorder 1 may have a function to record a program which is distributed via a network. In this case, a component which is identical to the digital signal processor 62 of the tuner 60 may be provided between the interface 12 and the recording processor 13.

It will be appreciated that, in connection with the conventional procedure up to a start of recording as shown in FIG. 6, any one or more processes may be omitted by utilizing the concept of the present invention. As a result, the amount of time required until recording can be started will be reduced by a period corresponding to the processing time of any such omitted process(es). For example, although the present embodiment illustrates an example where the entire signal processing circuit 10 of the recorder 1 is powered on or off, the effects of the present invention can also be obtained by keeping energized the system controller 11 alone, rather than the entire signal processing circuit 10. In that case, the initialization process of the system controller 11, the program loading process, the OS initialization process, and the application software initialization process are omitted, whereby the boot time of the recorder 1 until recording can be started is greatly reduced. The same principle also applies to any components other than the system controller 11.

Since information concerning the storage medium (e.g. whether writing is possible or not and remaining capacity) is retained in the RAM 20a even in a powered-off state, the recorder 1 may notify this information to the user immediately after boot. For example, by displaying via the state display section 40 or a display device that the storage medium cannot accept writing, the user is allowed to know immediately after powering on that a recordable storage medium needs to be mounted, thus being able to be quick in action. For the user's peace of mind in executing a recording, an assuring notice that "recording to the storage medium is possible" may be given, or the remaining recordable time may be notified, on the basis of the retained information.

In the description of the above embodiment, powering-on (turning on) meant supplying power, whereas powering-off (turning/cutting off) meant stopping supply of power. However, in the case where the drive section 50 has a sleep mode, the notion of powering on/off of the drive section 50 may be extended to include resuming from a sleep state as well as transitioning to a sleep state.

A sleep mode refers to a mode of operation in which power consumption is kept low while power is being supplied. When the drive section 50 is in a sleep state, power is being supplied to some or all of the components of the drive section 50, but control for some blocks in the drive section 50 that consume large power (e.g., a driving system such as a motor) is suspended. Alternatively, the clock for a control LSI (not shown) of the drive section 50 is stopped.

Transition to a sleep state is realized, for example, when the system controller 11 (FIG. 1) having executed software sends a command for transitioning to sleep (sleep command) to the drive section 50 based on the processing of the software. When the system controller 11 has placed the drive section 50 in a sleep state, the power controller 30 continues to supply power to the signal processing circuit 10, the drive section 50, and the system controller 11 itself.

On the other hand, a resume from a sleep state will require transferring a resume command or a process of resetting the drive section 50. Thus, a resume may take some time.

In the above embodiment, the powering on/off of the drive section 50 may read as "resuming from a sleep state" and "transitioning to a sleep state", respectively, in which case the power consumption will also be reduced. Such an alteration would also be effective in practicing the present invention.

A recorder according to the present invention is able to start recording after about one second since powering on. Therefore, the user is able to start recording from immediately after the exact scene at which the user wished to begin, recording. The, boot time, is greatly reduced as compared to that of a conventional recorder, which would have required 20 to 30 seconds until recording can be started. Thus, a very convenient apparatus is provided.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-376331 filed on Dec. 27, 2004 and No. 2005-369257 filed on Dec. 22, 2005, the entire contents of which are hereby incorporated by reference.

What is claimed is:

1. A data processing apparatus comprising:
a power controller for controlling powering on or off;
a signal processing circuit for generating video and/or audio data; and
a drive section for writing the generated data to a storage medium,
wherein, in response to a powering-off instruction, the power controller stops supplying power to the drive section but continues to supply power to the signal processing circuit and the power controller itself, and
the data processing apparatus further comprises a receiving section for receiving a signal containing the video and/or audio;
the signal processing circuit generates the data based on the received signal; and
in response the powering-off instruction, the power controller stops supplying power to the receiving section.

2. The data processing apparatus of claim 1, wherein,
the data processing apparatus further comprises a data storing section; and
before the power controller stops supplying power to the drive section, the signal processing circuit executes at least one operation selected from the group consisting of: determination of a type of the storage medium; determination of whether writing to the storage medium is possible or not; determination of a remaining capacity of the storage medium; and acquisition of a control parameter necessary for the drive section to perform a data write operation, and the signal processing circuit writes information indicating results of the operation to the data storing section.

3. The data processing apparatus of claim 2, wherein, in response to the powering-off instruction, the power controller continues to supply power to the data storing section.

4. The data processing apparatus of claim 1 wherein,
the signal processing circuit comprises:
a system controller for controlling an operation of the entire data processing apparatus;
an interface for receiving a signal related to the video and/or audio;
a recording processor for generating the data based on the received signal; and
a recording controller for outputting the generated data to the drive section, and instructing the drive section to write the generated data, and
in response to the powering-off instruction, the power controller continues to supply power to at least the system controller.

5. The data processing apparatus of claim 1, wherein, based on an instruction from a user, the power controller chooses whether or not to continue to supply power to the signal processing circuit.

* * * * *